(12) United States Patent
Valcov

(10) Patent No.: US 11,027,444 B2
(45) Date of Patent: Jun. 8, 2021

(54) SHAVING SYSTEM

(71) Applicant: Aqua Jet Razor LLC, North Miami, FL (US)

(72) Inventor: Victor Valcov, Chisinau (MD)

(73) Assignee: AQUA JET RAZOR LLC, North Miami, FL (US)

( * ) Notice: Subject to any disclaimer, the term of this patent is extended or adjusted under 35 U.S.C. 154(b) by 0 days.

(21) Appl. No.: 16/499,381

(22) PCT Filed: Feb. 7, 2018

(86) PCT No.: PCT/MD2018/000001
§ 371 (c)(1),
(2) Date: Sep. 30, 2019

(87) PCT Pub. No.: WO2018/182391
PCT Pub. Date: Oct. 4, 2018

(65) Prior Publication Data
US 2020/0047361 A1    Feb. 13, 2020

(30) Foreign Application Priority Data

Mar. 31, 2017    (MD) .................. MD a 2017 0036

(51) Int. Cl.
*B26B 21/44*    (2006.01)
*A61C 17/22*    (2006.01)

(52) U.S. Cl.
CPC .......... *B26B 21/446* (2013.01); *A61C 17/227* (2013.01)

(58) Field of Classification Search
CPC .......................... B26B 21/446; A61C 17/227
See application file for complete search history.

(56) References Cited

U.S. PATENT DOCUMENTS

| 4,177,556 A | 12/1979 | Galli, Jr. |
| 2009/0320293 A1 | 12/2009 | Clarke |

(Continued)

FOREIGN PATENT DOCUMENTS

| CN | 103909531 A | 7/2014 |
| CN | 205572483 U | 9/2016 |

(Continued)

*Primary Examiner* — Omar Flores Sanchez
(74) *Attorney, Agent, or Firm* — Trueba & Suarez PLLC; Roberto M. Suarez; William R. Trueba, Jr.

(57) ABSTRACT

The invention relates to shaving systems containing a handle and replaceable cartridges and allowing a liquid to be supplied to the skin of the user during use. A shaving system comprises a handle (1) having an internal channel (2) for passing liquid; an adapter head (3) on the proximal end of the handle (1), having a slot-type channel (4) which communicates with the channel (2) of the handle (1); a cartridge holder (5) in the form of a floating arm which has an internal slot-type channel (6) and is disposed on the proximal end of the head (3), said slot-type channel communicating with the slot-type channel (4) of the head (3); a replaceable cartridge (7) and an adapter (8) connected to a liquid supply and having an internal channel (9) for passing liquid. The connections between adapter (8) and handle (1), handle (1) and head (3), and head (3) and cartridge holder (5) are made detachable by means of a pin/plug connection. The result is an improved quality of shaving and rinsing of the shaver, as well as reduced design complexity.

5 Claims, 2 Drawing Sheets

(56) References Cited

U.S. PATENT DOCUMENTS

| | | |
|---|---|---|
| 2010/0236071 A1 | 9/2010 | Szczepanowski et al. |
| 2011/0146080 A1 | 6/2011 | Pauw |
| 2012/0102748 A1* | 5/2012 | Wain .................. B26B 21/4018 30/41 |
| 2012/0167393 A1* | 7/2012 | Lelieveld .............. B26B 21/446 30/41 |
| 2013/0145625 A1* | 6/2013 | Xu ........................ B26B 21/521 30/41 |
| 2015/0121705 A1* | 5/2015 | Coffindaffer ........... A61K 8/891 30/41.5 |
| 2015/0239138 A1* | 8/2015 | Kurzet .................. B26B 21/446 30/41 |
| 2016/0271816 A1 | 9/2016 | Xu et al. |
| 2017/0001322 A1* | 1/2017 | Shorey .................. B26B 21/522 |
| 2017/0225345 A1* | 8/2017 | Burrowes .............. B26B 21/528 |
| 2017/0368702 A1* | 12/2017 | Wain ....................... B26B 19/40 |
| 2018/0200900 A1* | 7/2018 | Eagleton ................ A45D 34/00 |
| 2018/0222070 A1* | 8/2018 | Burrowes .............. B26B 21/528 |
| 2019/0069979 A1* | 3/2019 | Scheuren ............ A46B 15/0061 |
| 2019/0117357 A1* | 4/2019 | Boersma .............. A61C 17/227 |
| 2019/0193293 A1* | 6/2019 | Peach .................... B26B 21/446 |
| 2019/0299467 A1* | 10/2019 | Bassett ................. B26B 21/522 |
| 2019/0351463 A1* | 11/2019 | Wupendram ...... A61C 17/3418 |

FOREIGN PATENT DOCUMENTS

| | | | |
|---|---|---|---|
| EG | 27151 | A | 8/2015 |
| ES | 1033551 | U | 2/1997 |
| GB | 2141656 | A | 1/1985 |
| GB | WO2000047374 | A1 | 8/2000 |
| JP | 2007175358 | A | 7/2007 |
| RU | 253306 | C1 | 11/2014 |

\* cited by examiner

SHAVING SYSTEM

CROSS-REFERENCE TO RELATED APPLICATIONS

This application is submitted under 35 U.S.C. 371 as a US National Stage Entry of PCT/MD2018/000001, with a filing date of Feb. 7, 2018. PCT/MD2018/000001 claims priority to Moldovan Application Number a 2017 0036, filed on Mar. 31, 2017, which priority claim was acknowledged by the the International Bureau.

FIELD OF THE INVENTION

The invention relates to multifunctional shaving systems comprising a handle and replaceable attachments, and allowing liquid to be supplied to the user's skin or teeth during use.

BACKGROUND OF THE INVENTION

Shaving systems (safety razors) are known, which comprise a handle and replaceable cartridges, wherein inside the handle there is a container for liquid and a channel for supplying liquid to the cartridge blades (see, for example, patents RU 2413605, 2487010, 2605031, 2557116, 2508982 and a number of other patents referenced therein). The cost of production of such razors tends to increase based on a number of manufacturing positions, and, moreover, if there is liquid remaining inside the razor between shavings, it promotes microbial growth, which adversely affects the user's skin causing, for example, skin irritation, etc. (this problem is described in RU 2487010, 2508982, 2533306).

From U.S. Pat. No. 4,177,556 a razor is known comprising a handle with an inner channel for passing liquid, the proximal end of which is provided with a head, which widens in the direction from the handle and contains a mechanism for securing replaceable cartridges. The distal end of the handle is provided with an opening for connecting the razor to the source of liquid by means of a tubing. The handle is provided with a valve mechanism controlling the flow of liquid along the channel. Inside the head, there is a slotted opening connected with the channel and used to supply liquid to the blades across the entire width thereof. There is a threaded connection between the distal end of the handle and the tubing of the liquid source.

Since the handle and the head which holds the cartridges are made as one piece, the angle of incidence of the blades will be determined by the angle of inclination of the head relative to the handle, which is not always convenient for shaving various areas of the body. The threaded connection between the handle and the tubing of the liquid source is laborious during both, razor manufacturing and use. It is also known that each manufacturer produces various models of razors requiring specific models of cartridges. For each razor model, there is a dedicated cartridge model. The prototype razor is made as one piece, and should the manufacturer stop making specific cartridge models and move on to new and improved models of razors and cartridges for them, the described razor would have to be disposed of.

BRIEF SUMMARY OF THE INVENTION

The task this invention intends to solve is to create a simple and inexpensive multifunctional shaving system for high-quality and convenient shaving, as well as provide the possibility of using individual elements thereof in combination with other devices of hygienic use.

This task is solved by the fact that the multifunctional shaving system comprises a handle with an internal channel for passing liquid, having a proximal end and a distal end; a transition head connectable to the proximal end of the handle with a slot-type channel communicating in a connected state with the channel of the handle; a cartridge holder in the form of a floating arm with an internal slot-type channel connectable to the proximal end of the transition head communicating in a connected state with the slot-type channel of the transition head; and a removable cartridge, further an attachment connectable to the proximal end of the handle provided with a head with cleaning members on its outer surface for oral care, the attachment contains a channel communicating in a connected state with the channel of the handle and the outer surface of the head with the cleaning members, wherein the connections between the handle and the transition head, the transition head and the cartridge holder, the handle and the attachment are made detachable using a pin/plug connection, while in the distal end of the handle a socket is provided for inserting a proximal end of an adapter with an internal channel for passing liquid from a liquid source, and the connection between the cartridge and cartridge holder is configured to ensure the possibility of cartridge floating in its holder.

The cartridge holder may contain an internal perforated partition covering the slot-type channel of the transition head, and at least one of its extending fins connected with the cartridge is made elastic.

The handle may contain a mechanism to control the flow of liquid inside the channel.

The shaving system may contain an adapter connected to the liquid source and containing an internal channel, which is interconnected with the channel inside the handle and provided with a circular collar on the outer surface of a pin/plug proximal end, while inside the socket at the distal end of the handle along the channel, a spring-loaded bushing is installed configured to move across the socket and having an inner diameter matching the outer diameter of the collar.

The distal section of the adapter may contain a female or male threads, or the outer distal portion of the adapter can be provided with a circular collar.

Making the system consisting of individual components allows reducing the cost of production, since no complicated molds (dies) will be required for fabrication. In addition, making the cartridge holder and the head detachable will allow using an existing shaving stick (i.e., getting new models of cartridges with their holders) when switching to producing new models of cartridges provided there is a corresponding mounting (docking) socket/extension. This will reduce consumer expenses. The presence of a perforated partition in the cartridge holder will significantly reduce the likelihood of clogging the slot-type channel in the head with hair (bristles), and since the holder is detachably attached to the head, it can be easily removed and cleaned even if it does get clogged (plugged). A pin/plug connection of the system elements ensures its quick and convenient assembly and disassembly. The presence of the adapter allows for convenient connection of the system to the source of liquid (water supply). For example, by making the distal section thereof threaded, it becomes possible to permanently connect it to a shower hose. In this case, a receiving (female) adapter is permanently attached to the shower head, or to the hose section of the shower head. This allows using a single hose for performing various procedures. If the distal section of the adapter contains a circular collar, the system can be connected to the spout of the water faucet (as in the prototype) by using a hose having elastic members (couplings) installed at its ends. If the shaving system has an oral care attachment, it becomes possible to use its members (parts/assemblies, such as adapter, handle) for performing additional hygienic procedures. The presence of the liquid flow control mechanism will increase the convenience of using the system.

DETAILED DESCRIPTION

Figure 1:
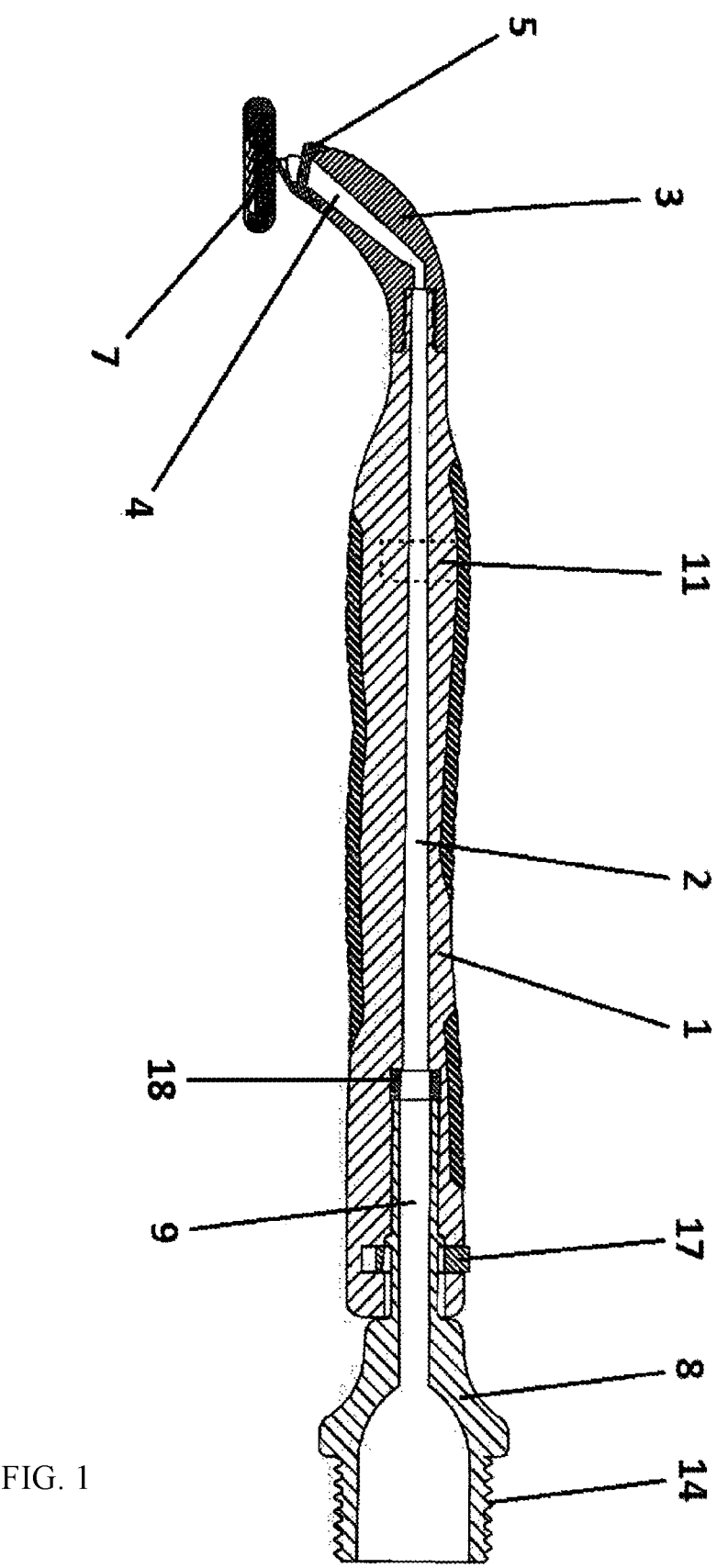
FIG. 1 shows a longitudinal section of the device assembly.
Figures 2, 3:
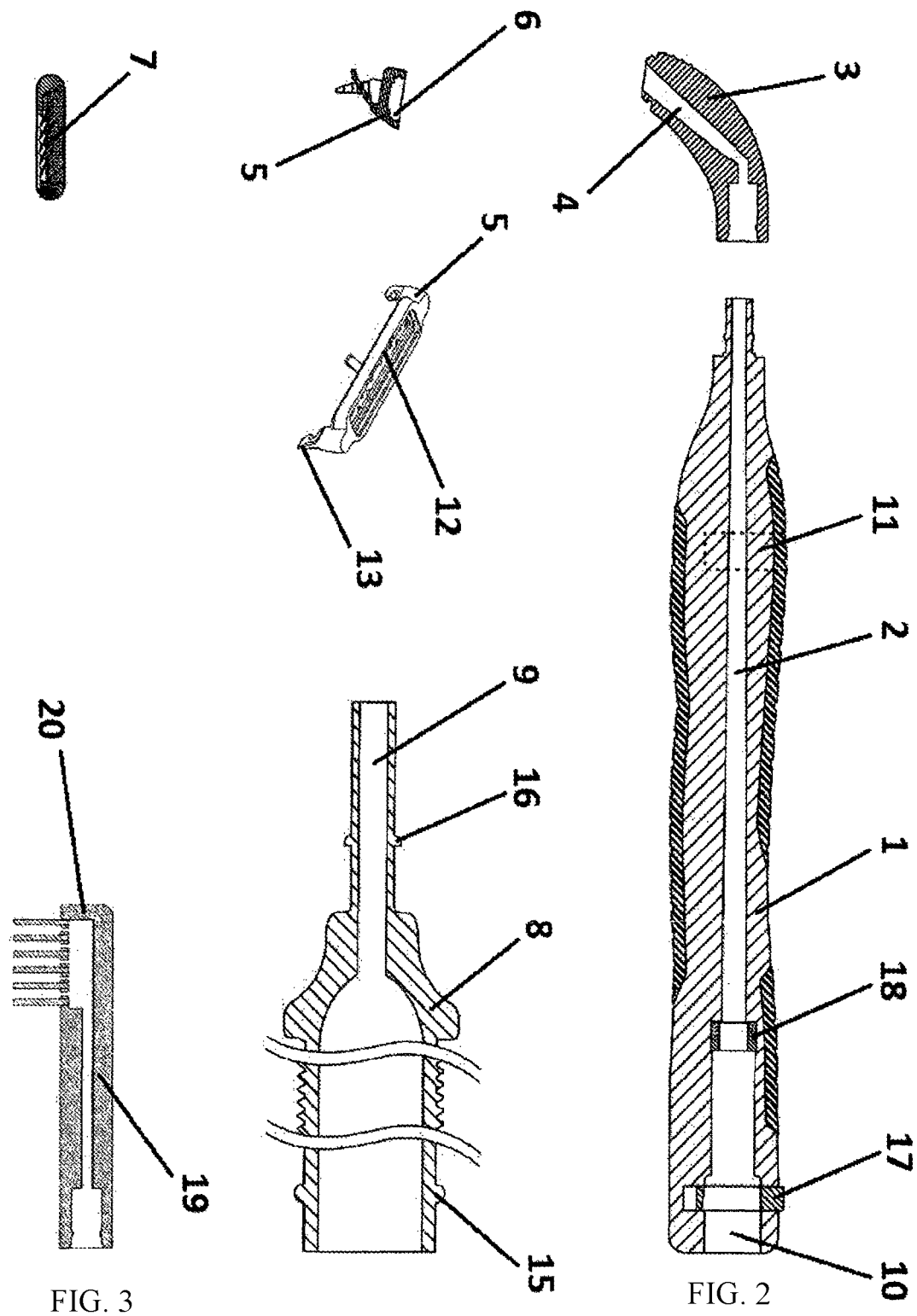
FIG. 2 shows an exploded view of the shaving system of FIG. 1.
FIG. 3 shows a section of the attachment with a toothbrush.

Referring now to the drawings, in a preferred embodiment of the disclosure, the shaving system includes a handle (1) with an inner channel (2) for passing liquid having proximal and distal ends; head (3) at the proximal end of the handle (1) with a slot-type channel (4) interconnected with the channel (2) of the handle (1); a cartridge holder (5) in the form of a floating arm with an inner slot-type channel (6) at the proximal end of the head (3) and interconnected with the slot-type channel (4) of the head (3); a removable cartridge (7) and adapter (8) connected to the liquid source with an inner channel (9) for passing liquid. The connection between the adapter (8) and handle (1), handle (1) and head (3), and head (3) and cartridge holder (5) are made detachable by means of a pin/plug connection.

The distal end of the handle (1) is provided with a socket (10) for a pin/plug proximal end of the adapter (8). Mounted on the handle (1) can be a mechanism (11) controlling the flow of liquid in channel (2). The design of the mechanism is not disclosed in detail, but it is known from the prior art and, for example, is the same as in the prototype. Or a section of the channel (2) can be made of an elastic tubing and opening/closing the channel will occur by pressing a button located on the outer surface of the handle. Or the flow control will be performed in the following positions of the mechanism: "open", "closed", "more-less". Mechanism (11) may be absent altogether, and the flow control can be performed directly by the tap water faucet. The cartridge holder (5) is provided with an internal perforated partition (12), which prevents clogging of the slot-type channel (4) of the head (3). At least one extending fin (13) of the holder (5) is made elastic, which helps with installing and securing of the cartridge (7). The connection between cartridge (7) and cartridge holder (5) is configured to allow cartridge floating, which increases the convenience of use and the shaving quality of various body parts.

The models of the shaving sticks with floating heads or elastic (flexible) proximal section of the handle are well known from the prior art. The distal section of the adapter (8) may contain a male (or female) thread (14) or a circular collar (15) for connecting to a water source. In the specific embodiment, a circular collar (16) is provided on the outer surface of the pin/plug end (11) of the adapter (8), while inside the socket (10) at the distal end of the handle (1) along the channel (2), a spring-loaded bushing (17) is installed configured to move across the socket and having an inner diameter matching the outer diameter of the collar. When the adapter is not inserted into the handle, the spring causes a displacement of the bushing in the axial direction relative to the longitudinal axis of channel (2). To insert an adapter into the handle, for example, by using a button, the bushing is moved to a position, in which the axis of the bushing (17) matches the axis of the inserted end of the adapter. After collar (16) passes through the bushing (17), and the end of the adapter is firmly pressed against the elastic ring gasket (18) installed within slot (10) in the direction of water flow, the button is released and adapter (8) is fixed in handle (1).

But this is only a single example of a specific embodiment. There are numerous reliable sealed designs of the pin/plug connection of the (pipeline) parts. Obviously, the shaving stick can be used in the usual way, without using an adapter. Attachment (19), which houses head (20) with cleaning members and which contains a channel interconnected with the channel (2) in the handle (1) and with the outer surface of the head, is installed in the handle (1) and allows to perform oral care. This expands the field of application of the device elements. Toothbrushes with liquid supplied to the head are known: RU 2601930, RU 2549315, and RU 2455914.

The device is easy to manufacture, intuitive to assemble, and convenient to use. When shaving, water acts as a lubricant. Cleaning of the blades from removed hair is also provided, which improves the quality and convenience of shaving. Conditions are created for adopting new models of cartridges in already existing handle with the head, which will reduce consumer expenses. An additional oral care attachment will allow using the handle with the adapter from a razor, which will also reduce consumer expenses. It should be noted that the provided description of the specific embodiment of the invention is given for illustration purposes, since various changes and modifications within the scope of the invention defined by the claims will be obvious for those skilled in the art.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A multifunctional shaving system comprising:
   a handle with an internal channel for passing liquid from a liquid source, the handle having a proximal end and a distal end;
   a transition head connectable to the proximal end of the handle with a slot-type channel communicating in a connected state with the internal channel of the handle;
   a cartridge holder in the form of a floating arm with an internal slot-type channel connectable to a proximal end of the transition head communicating in a connected state with the slot-type channel of the transition head; and
   a removable cartridge, further comprising an attachment connectable to the proximal end of the handle provided with a head with cleaning members on its outer surface for oral care, the attachment contains a channel communicating in a connected state with the channel of the handle and the outer surface of the head with the cleaning members, wherein the connections between the handle and the transition head, the head and the cartridge holder, the handle and the attachment are made detachable using a pin/plug connection, while in the distal end of the handle a socket is provided for inserting a proximal end of an adapter with an internal channel for passing liquid from a liquid source, and the connection between the cartridge and cartridge holder is configured to ensure the possibility of cartridge floating in its holder.

2. The multifunctional shaving system according to claim 1, wherein the cartridge holder comprises:

an internal perforated partition, covering the slot-type channel of the transition head; and extending fins;

wherein at least one of the extending fins, connected to the cartridge, is elastic.

3. The multifunctional shaving system according to claim 1, wherein the handle comprises a mechanism for controlling the flow of liquid inside the channel.

4. The multifunctional shaving system according to claim 1, comprising an adapter with an internal channel connected to a liquid source and communicating with the internal channel of the handle, and on the outer surface of a pin/plug proximal end of the adapter a circular collar is provided, while inside the socket at the distal end of the handle along the channel, a spring-loaded bushing is installed configured to move across the socket and having an inner diameter matching the outer diameter of the collar.

5. The multifunctional shaving system according to claim 4, wherein the distal section of the adapter contains inner or outer threads, or a circular collar is provided on the outer distal portion of the adapter.

* * * * *